(12) United States Patent
Hamilton

(10) Patent No.: US 8,276,217 B1
(45) Date of Patent: Oct. 2, 2012

(54) PERSONAL ROLL BAR

(76) Inventor: Kurt Hamilton, Orange, CA (US)

( * ) Notice: Subject to any disclaimer, the term of this patent is extended or adjusted under 35 U.S.C. 154(b) by 140 days.

(21) Appl. No.: 12/850,030

(22) Filed: Aug. 4, 2010

(51) Int. Cl.
*A41D 13/00* (2006.01)

(52) U.S. Cl. .............. 2/467; 2/424; 2/425; 2/468; 2/2.5

(58) Field of Classification Search .............. 2/424, 425, 2/422, 410, 2.5, 467, 468; 602/20
See application file for complete search history.

(56) References Cited

U.S. PATENT DOCUMENTS

| | | | |
|---|---|---|---|
| 1,466,726 A | 9/1923 | Meeks | |
| 3,278,230 A | 10/1966 | Boyce et al. | |
| 3,878,561 A | 4/1975 | Winiecki | |
| 3,879,761 A | 4/1975 | Bothwell | |
| 3,978,525 A | 9/1976 | Bothwell | |
| 3,991,421 A | 11/1976 | Stratten | |
| 4,299,406 A | 11/1981 | Thomas | |
| 5,123,408 A * | 6/1992 | Gaines | 602/17 |
| 5,715,541 A | 2/1998 | Landau | |
| 6,253,389 B1 | 7/2001 | Scaglione | |
| 6,385,781 B1 | 5/2002 | Rose et al. | |
| 6,461,256 B1 * | 10/2002 | Popeck | 473/450 |
| 7,120,941 B2 | 10/2006 | Glaser | |
| 7,941,873 B2 * | 5/2011 | Nagely et al. | 2/425 |
| 2004/0194194 A1 * | 10/2004 | McNeil et al. | 2/421 |
| 2010/0122404 A1 * | 5/2010 | Bowlus et al. | 2/467 |

* cited by examiner

*Primary Examiner* — Alissa Tompkins
(74) *Attorney, Agent, or Firm* — Mind Law Firm, P.C.; Jeromye V. Sartain; Justin G. Sanders

(57) ABSTRACT

A personal roll bar device for protecting a user's head, neck and back provides, in the exemplary embodiment, an impact member positioned adjacent the user's back and removably engaged with the user proximal the user's waist, the impact member extending upwardly therefrom above the user's head. A stabilizing means is removably engaged with the user's upper body and slidably coupled with the impact member, and is configured for maintaining the impact member adjacent the user's back during use. Thus, in the event the user experiences a head-first fall while using the device, an upper end of the impact member substantially protects the user's head and neck from initial impact, with the resulting impact forces being distributed through the impact member and substantially absorbed by the user's waist, thereby reducing the risk of burst and compression fractures in the user's neck and back.

14 Claims, 3 Drawing Sheets

PERSONAL ROLL BAR

BACKGROUND OF THE INVENTION

Related Applications

Not applicable.

INCORPORATION BY REFERENCE

Applicant hereby incorporates herein by reference any and all U.S. patents and U.S. patent applications cited or referred to in this application.

FIELD OF THE INVENTION

Aspects of this invention relate generally to a personal safety device, and more particularly to a personal roll bar device that is removably engagable with a user and configured for protecting primarily the user's head, neck and back in the event the user experiences a head-first fall.

DESCRIPTION OF RELATED ART

The following art defines the present state of this field:

U.S. Pat. No. 1,466,726 to Meeks discloses a fireproof garment comprising a pair of curved supporting members adapted to rest upon the shoulders of the wearer, the lower ends of said supporting members being provided with openings for the reception of a flexible fastening member surrounding the body of the wearer, a substantially rigid frame mounted on said supporting members, said frame being adapted to surround the head of a wearer and be spaced therefrom and a garment of fireproof material, said garment consisting of a body covering, and an integral hood resting on said frame to support it.

U.S. Pat. No. 3,278,230 to Boyce et al. discloses a personal restraint system comprising a light weight, rigid torso shell which also forms a portable, pivoted seat back and is fitted to the individual. It has a structural frame integrated with a posterior shell and carries an integral head rest and attachment points for fastening to a permanent seat in the vehicle. Fitted inside the shell is a liner consisting of an open-celled foam sponge which is completely saturated with a liquid and encased within a flexible sheath. When not under pressure, this liner provides comfort to the wearer, and when the volume of liquid is increased by pumping, it becomes relatively incompressible and forms a tight fitting, contoured, load carrying pad. This provides the maximum protection to the soft tissues of the body and prevents the loosely hug, internal organs of the thorax and stomach from displacement.

U.S. Pat. No. 3,878,561 to Winiecki discloses a protector for motorcycle riders of generally a jacket type that includes a rigid vest with interlocking front and back plates which are hinged together along one side edge and are latched together on an opening side edge. A generally divergent collar is integral with and extends from the upper portions of the front and back plates and a rigid skirt with leg openings and hinged along one edge and latched upon another edge is attached to the lower portions of the front and back plates. A two-pieced halo of tubing is attached to the rear plate and extends over the collar. Padding means which is optionally inflatable for size adjustments is attached to at least interior portions of the vest, skirt, and collar.

U.S. Pat. No. 3,879,761 to Bothwell discloses a head and chest protector, for example for a motor cyclist, which comprises a helmet located within and rotatably supported by a rigid outer structure having a part which, in use, extends over the upper chest of the wearer and including means engagable with the shoulders of the wearer whereby the weight of the protector including the helmet is transmitted direct to the trunk of the wearer and not through his neck. There is a ball and socket engagement between the helmet and the outer structure, and an inertia reel which is fixed to the outer structure and has its webs connected to the helmet may be provided for controlling rotational movement of the helmet relative to the motor structure. The outer structure is shock-resisting and comprises a layer of foamed plastics material sandwiched between two layers of glass fiber, and the helmet is shock-absorbing and comprises a layer of foamed plastics material with a sheet of plastics material secured to the outer surface of said foamed material. The outer structure may embody a roll bar.

U.S. Pat. No. 3,978,525 to Bothwell discloses a head, neck and chest protector, for example for a motor cyclist, comprising a rigid outer shell which comprises a head section formed wholly to enclose the head of the wearer and having a transparent part at the front thereof, a neck section rigidly connected to the head section and formed to surround the neck of the wearer and a chest section rigidly connected to the neck section and formed to extend over the upper chest of the wearer, and a helmet for fitting on the head of the wearer which is located within a cavity in the head section of the outer shell, the cavity being larger than the helmet so that the latter is movable therein and the helmet being suspended in the cavity by a plurality of elongate elements which are attached to the helmet at different locations over its outer surface and are connected to an inertia reel adapted normally to permit free movement of the helmet relative to the outer shell but being responsive to movement of the helmet at an acceleration above a predetermined value to bring into operation a shock absorber which shock damps movement of the helmet. The outer shell is externally generally of bullet-shape with a rounded nose.

U.S. Pat. No. 3,991,421 to Stratten discloses a plurality of interlocking reinforced barrel shaped plastic torso fitting embers having a transparent vented plastic head piece threadably connected thereto. The torso members are suspended and attached to the wearer by adjustable strapping. Compliant material is used intermediate the shock resisting members and the wearer to help position the armor on the wearer and to attenuate the transmission of blast shock waves from the armor to the wearer. The openings in the armor, to accommodate the wearer's appendages, are hermetically sealed by a lining made of rubber material. Air for breathing is brought into the helmet and exhausted therefrom by intake and exhaust check-valves which are actuated by the wearer's normal breathing.

U.S. Pat. No. 4,299,406 to Thomas discloses a system for preventing injury to a motorcyclist in the event of a crash employing a rigid framework surrounding the upper body of the cyclist and inflatable air bags which both surround the cyclist with the ballooning air cushion and also serve to draw the cyclist's legs upwardly to prevent injury during the crash. A rigid body shell may be employed to encase the torso of the cyclist, or a space frame formed of a plurality of rigid elements may be utilized to protect the cyclist in the crash. A specialized seat can be employed which serves to eject the cyclist from the cycle when a crash is either imminent or is actually occurring.

U.S. Pat. No. 5,715,541 to Landau discloses a brain and spinal cord protector to protect the brain and spinal cord of a user against a fall. The protector comprises a jacket which is worn about the user's torso, a head shield shaped to cover the user's head, a support extending from the jacket to the head shield to position the head shield above the jacket so that the inner surface of the head shield is spaced from the user's head. This will allow the user to have full and free movement of his head relative to the head shield when wearing the head shield, and will prevent forces which impact the head shield from impacting the head, and will prevent compression and bending injuries to the neck, the forces of such impacts being transferred to the vest through the support.

U.S. Pat. No. 6,253,389 to Scaglione discloses a protective garment for preventing injury to the head, neck and torso. A helmet is rotatable mounted on a vest that includes a back section and a left front section and a right front section. The left front section are both mounted to rotate on the back section to be folded together to hold the helmet on the vest.

U.S. Pat. No. 6,385,781 to Rose et al. discloses a high energy shock absorbing and dissipating device designed to be mounted on existing shoulder pads for football, hockey, dirt bike riders, etc. The head of the wearer is in a spaced relation to the inside surfaces. It consists of a crown structure and a lower support structure with vertical shock absorbing springs in between. An energy dissipating foam annular band is in a plane at the forehead level to attenuate the forces from whiplash-type movements. The possibility of the wearer receiving a concussion is virtually eliminated and will have the maximum of protection against devastating spinal cord injuries.

U.S. Pat. No. 7,120,941 to Glaser discloses a crash helmet assembly including a lightweight shell or lattice of sufficiently rigid material and geometric design to surround but not contact the user's head. The helmet is affixed to a rigid vest-like garment by interconnecting rigid straps and braces such that the resulting combination deflects compression impact forces away from the head and neck and onto the user's shoulders and upper torso.

The prior art described above teaches various types of roll bar-like devices that are configured to be worn around a user's head, such as in the form of an enlarged helmet or elongate rigid tubing that is positioned above and spaced apart from the top of the user's head. However, these devices are typically engaged on or about the user's shoulders and/or upper back. As such, in the event the user were to experience a head-first fall with one of these prior art devices, while their head and neck would likely be protected from the initial impact, their shoulders and/or back would likely absorb a majority of that impact. Thus, while these prior art devices may assist in preventing burst fractures of the user's neck and back, they would likely not effectively prevent compression fractures. Therefore, there is a need for a relatively lightweight personal roll bar device capable of protecting the user from both burst and compression fractures in their neck and back in the event the user experiences a head-first fall, while also affording the user substantially unobstructed freedom of movement. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the problems described above by providing a personal roll bar device for protecting a user's head, neck and back. The device provides, in the exemplary embodiment, an impact member positioned adjacent the user's back and removably engaged with the user proximal the user's waist, the impact member extending upwardly therefrom above the user's head. A stabilising means is removably engaged with the user's upper body and slidably coupled with the impact member, and is configured for maintaining the impact member adjacent the user's back during use. Thus, in the event the user experiences a head-first fall while using the device, an upper end of the impact member protects the user's head and neck from initial impact, with the resulting impact forces being distributed through the impact member and absorbed by the user's waist, thereby reducing the risk of burst and compression fractures in the user's neck and back.

A primary objective inherent in the above described apparatus and method of use is to provide advantages not taught by the prior art.

Another objective is to provide such an apparatus that is configured for protecting the user's head, neck and back in the event the user experiences a head-first fall.

Another objective is to provide such an apparatus that provides an impact member having a primary engagement point proximal the user's waist or hips.

Yet another objective is to provide such an apparatus that is relatively lightweight and affords the user substantially unobstructed freedom of movement.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION OF THE INVENTION

The above described drawing figures illustrate aspects of the invention in at least one of its exemplary embodiments, which are further defined in detail in the following description.

Figures 1, 2:
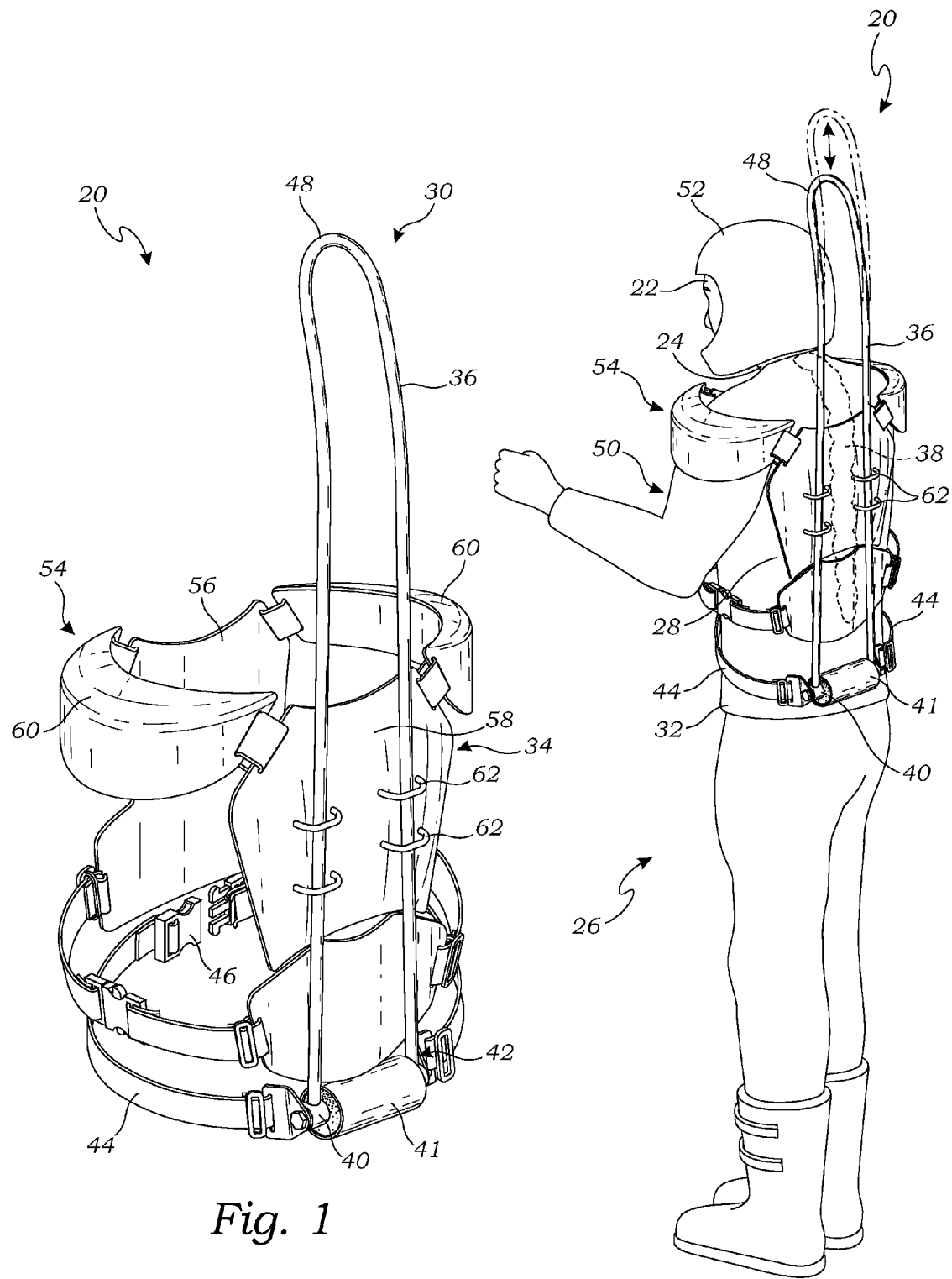
FIG. 1 is a perspective view of an exemplary embodiment of the invention.
FIG. 2 is a perspective view thereof as worn by a user.

Described now in detail is a personal roll bar device 20 for protecting a head 22 and neck 24 of a user 26, while also reducing the risk of burst and compression fractures in the user's neck 24 and back 28, in the event the user 26 experiences a head-first fall. As shown in FIG. 1, aspects of the device 20 comprise, in the exemplary embodiment, an impact member 30 configured to be removably engaged with the user 26, proximal a waist 32 of the user 26, and a stabilizing means 34 slidably coupled with the impact member 30 and configured for stabilizing and maintaining the impact member 30 in a position substantially parallel with and adjacent to the user's back 28, neck 24 and head 22 during use. While one or more exemplary embodiments are thus shown and described herein, it will be appreciated by those skilled in the art that the invention is not limited to the particular geometry and materials of construction disclosed, but may instead entail other functionally comparable structure now known or later developed without departing from the spirit and scope of the invention.

In the exemplary embodiment, the impact member 30 is an elongate rod 36 made of metal or some other relatively rigid, lightweight material. Preferably, the rod 36 is substantially U-shaped and configured for flanking the user's spine 38, as shown best in FIG. 2, the importance of which is discussed further below. It should be noted that the rod 36 will be used herein to illustrate the various features of the present invention; however, the structure of the impact member 30 should not be read as being so limited. In further embodiments, the impact member 30 may comprise any other structure, configuration, material, or combination thereof, now known or later developed, such as an elongate board, rigid canopy, or linear rod, capable of carrying out substantially the same functionality as the exemplary impact member 30 herein described. In one such further embodiment, not shown, a helmet 52 worn by the user 26 effectively forms part of the impact member 30 by either abutting an upper end 48 of the rod 36 directly or abutting a neck brace (not shown) or similar collar structure that is rigidly connected to the upper end 48 of the rod 36.

With continued reference to the exemplary embodiment of FIG. 1, a rigid crossbar 40 is integral with the rod 36, at or near a base 42 of the rod 36, and provides a means for removable engagement with the user 26, proximal the user's waist 32. Preferably, the means for removable engagement is a base strap 44 having a fastening means 46, such as a buckle or the like; however, other types of removable engagement means, now known or later developed, may be substituted. Additionally, the crossbar 40 preferably provides a pad 41 configured for creating a cushion between the crossbar 40 and the user's waist 32.

Figure 3:
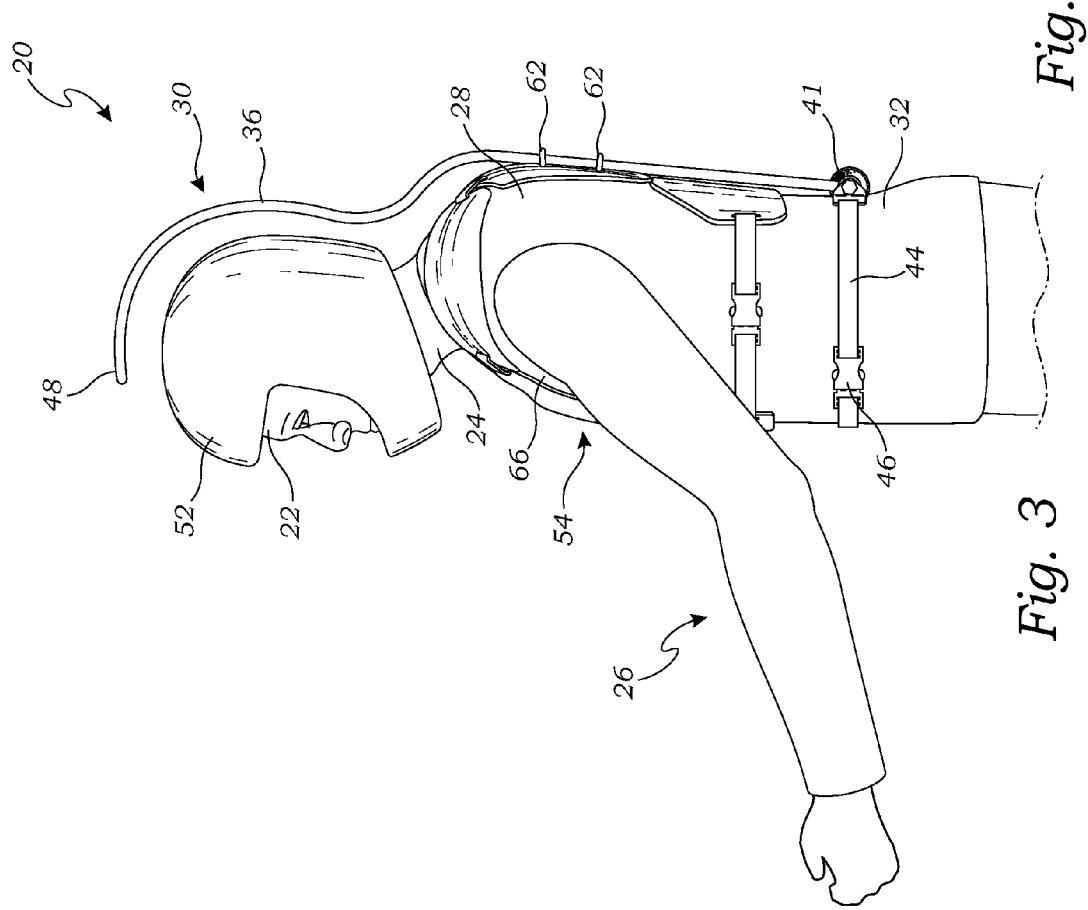
FIG. 3 is a side elevational view of an alternate embodiment of the invention as worn by the user.
Figure 5:
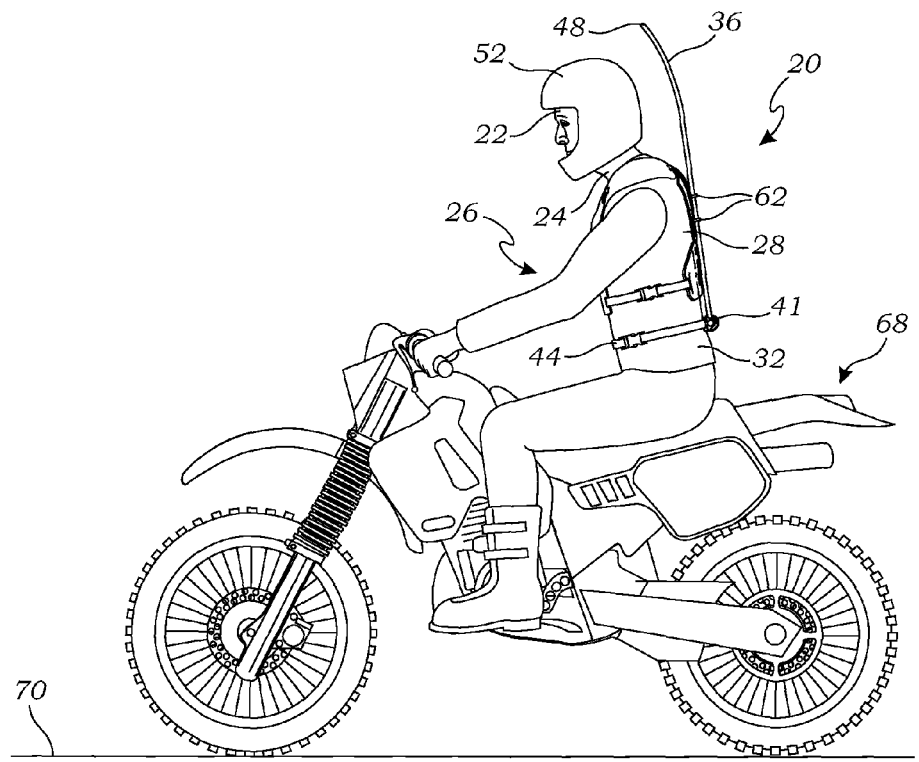
FIG. 5 is a side elevational view of the exemplary embodiment of the invention as worn by the user riding a motorcycle.

FIG. 2 shows the exemplary embodiment of the device 20 being worn by the user 26. More specifically, the base strap 44 is removably engaged about the user 26 at or near the user's waist 32, such that the rod 36 is positioned substantially parallel with and adjacent to the user's back 28, neck 24 and head 22, and the upper end 48 of the rod 36 is positioned a distance above the user's head 22 when the user 26 is standing (FIG. 2) or sitting upright (FIG. 5). In a further embodiment, also shown in FIG. 2, the height of the rod 36 may be selectively adjustable, using means now known or later developed such as a telescoping rod, to accommodate the particular dimensions of the user's torso 50, to ensure that the base strap 44 is engaged proximal the user's waist 32 while the upper end 48 of the rod 36 is positioned a sufficient distance above the user's head 22. It should also be noted that while the rod 36 in the exemplary embodiment is relatively straight, in alternate embodiments, the rod 36 may be configured to approximate the curvature of the user's back 28, neck 24 and head 22, as illustrated in FIG. 3. As also shown in FIG. 3, the upper end 48 of the rod 36 may curve a distance over the head 22 of the user 26. Regardless of its exact configuration, the rod 36 is sufficiently spaced from the user's head 22 for enabling the user 26 to comfortably wear the helmet 52 while using the device 20 and affords the user 26 substantially unobstructed movement of their head 22 and neck 24.

Referring again to FIGS. 1 and 2, the stabilizing means 34, in the exemplary embodiment, comprises a relatively rigid, lightweight upper body protector 54 configured for removable engagement with the user's torso 50. Similar to known prior art protectors, the upper body protector 54 preferably provides a front torso guard 56, a rear torso guard 58, and a pair of shoulder guards 60, or some combination thereof, for providing added protection to the user 26. The rear torso guard 58 also provides an at least one impact member guide 62 slidably coupled with the impact member 30 (or rod 36 in the exemplary embodiment) and configured for stabilizing and maintaining the rod 36 adjacent the user's back 28 during use of the device 20. The importance of this slidable coupling is discussed further below. In an alternate embodiment, shown in FIG. 4, the stabilizing means 34 simply comprises a stabilizer strap 64 configured to be removably engaged with the user 26 in a position above the base strap 44; preferably proximal the user's chest 66. The stabilizer strap 64 is preferably of similar construction as the base strap 44 and provides at least one impact member guide 62 slidably coupled with the impact member 30, similar to the upper body protector 54 of the exemplary embodiment described above.

FIG. 5 shows the exemplary embodiment of the device 20 in use, with the user 26 positioned on a motorcycle 68. It should be noted that while the device 20 is primarily intended to be used in the context of vehicle-related activities, such as motorcycle riding and the like, the device 20 may be effectively used in a variety of other activities as well, wherever there is a possibility of the user 26 experiencing a head-first fall. With continued reference to FIG. 5, the device 20 is configured such that, even when the user 26 is in a seated position, the base strap 44 is removably engaged proximal the user's waist 32, the rod 36 is positioned substantially parallel with and adjacent to the user's back 28, neck 24 and head 22, and the upper end 48 of the rod 36 is sufficiently spaced above the user's head 22. Additionally, given the relatively minimal and lightweight construction of the exemplary embodiment of the device 20, the user 26 is able to enjoy substantially unobstructed freedom of movement.

Figure 6:
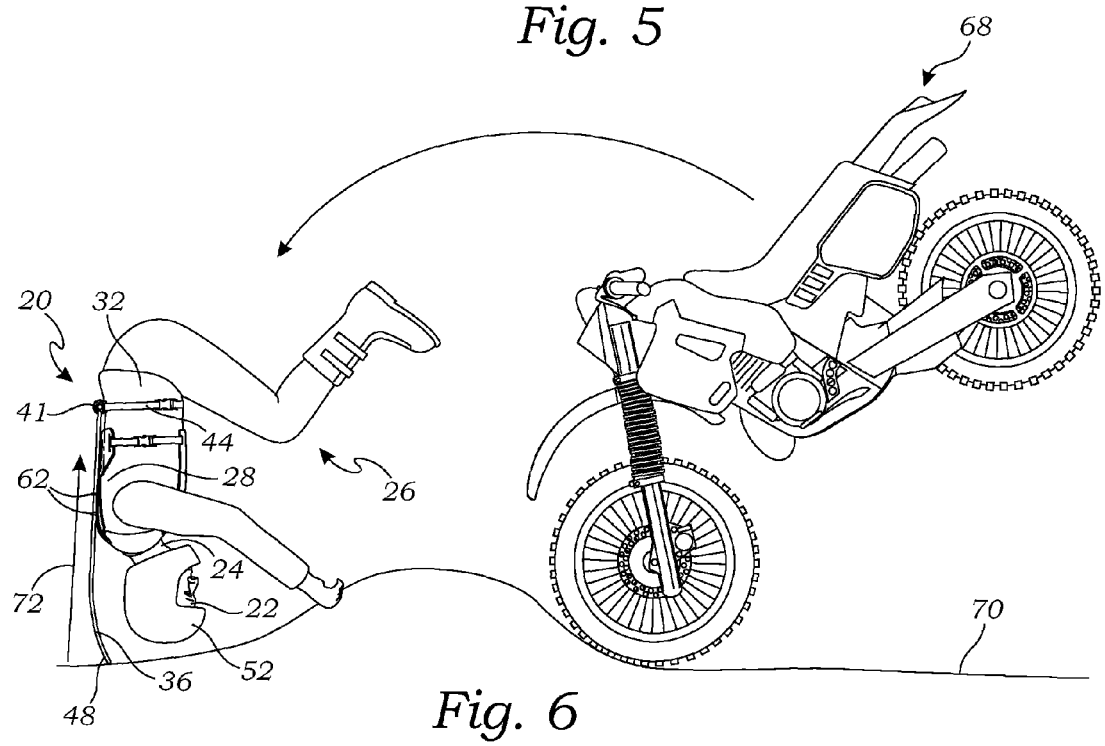
FIG. 6 is a side elevational view thereof, illustrating the user experiencing a head-first fall.

FIG. 6 illustrates the scenario of the user 26 experiencing a head-first fall, such as after being thrown from a motorcycle 68, while wearing the device 20. As the user's head 22 approaches the ground 70, or other surface, the upper end 48 of the rod 36 contacts the ground 70 instead, thus protecting the user's head 22 and neck 24 from the initial impact. Additionally, because the rod 36 itself is engaged with the user 26 proximal the user's waist 32, a substantial, if not entire, amount of resulting initial impact forces 72 are distributed through the rod 36, bypassing the user's head 22, neck 24, and back 28, and are absorbed by the user's waist 32, thereby reducing the risk of burst and compression fractures in the user's neck 24 and back 28 as well. While an initial impact with the ground 70 may sometimes cause the rod 36 to want to move out of position, depending on the trajectory of the head-first fall, the stabilizing means 34 assists in substantially reducing the rod's 36 movement; thus maintaining the rod 36 in a position substantially parallel with and adjacent to the user's back 28, neck 24 and head 22, regardless of trajectory. Furthermore, because the stabilizing means 34 is slidably, rather than rigidly, coupled with the rod 36, a relatively negligible amount of initial impact forces 72 will be distributed through the stabilizing means 34 or absorbed by the user's neck 24 or back 28. It should also be noted that if the rod 36 of the exemplary embodiment were to somehow fail during a head-first fall, and bend or break inwardly toward the user's back 28, the spine-flanking U-shaped configuration of the rod 36 will reduce the likelihood of causing damage to the user's spine 38.

Figure 4:
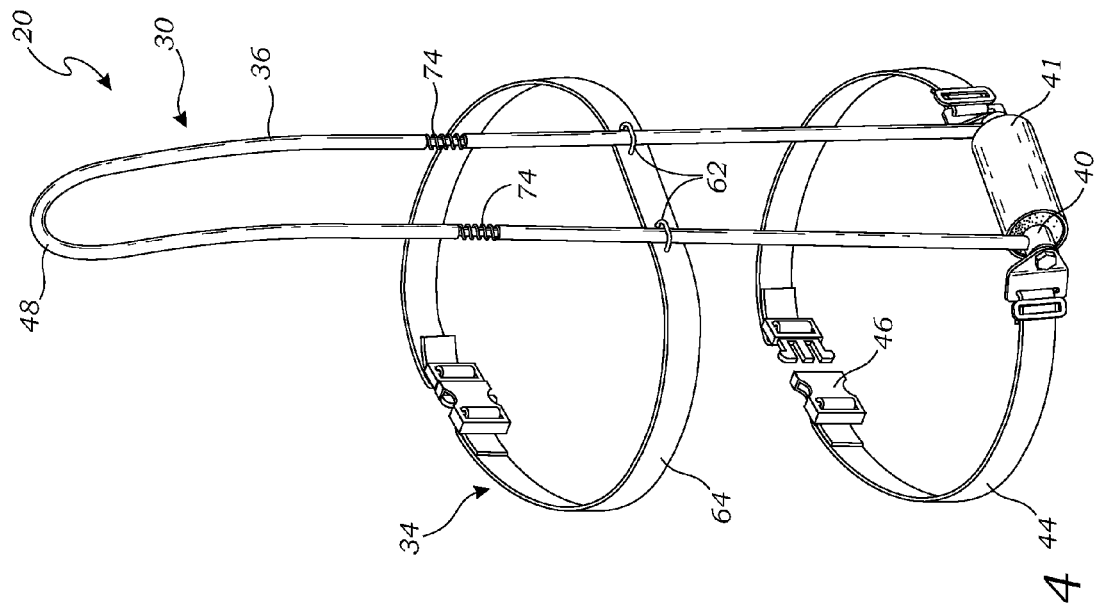
FIG. 4 is a perspective view of yet another embodiment of the invention.

In a further embodiment, as shown in the device 20 of FIG. 4, the rod 36 may provide an at least one shock absorbing means 74, such as a spring or the like, now known or later developed, configured for absorbing at least a portion of the initial impact forces 72 experienced by the rod 36 during a head-first fall before those forces 72 reach the user's waist 32.

Therefore, as discussed in detail above, the present invention provides a relatively lightweight solution for protecting the user's head 22, neck 24 and back 28 from both burst and compression fractures in the event the user 26 experiences a head-first fall, while also affording the user 26 substantially unobstructed freedom of movement during use of the device 20.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A personal roll bar device for protecting a user's head, neck and back and transferring impact forces substantially to the waist of the user in the event the user experiences a head-first fall, the device comprising:
   an impact member positioned adjacent the user's back and spaced apart from the user's head, neck and shoulders, the impact member removably engaged with the user's waist and extending upwardly therefrom above a top of the user's head; and
   a stabilizing means slidably coupled with the impact member and configured for maintaining the impact member adjacent the user's back during use;
   whereby, in the event the user experiences a head-first fall while using the device, an upper end of the impact member substantially protects the user's head and neck from initial impact, with the resulting impact forces being distributed through the impact member and substantially absorbed by the user's waist, thereby reducing the risk of burst and compression fractures in the user's neck and back.

2. The personal roll bar device of claim 1, wherein the impact member is an elongate rigid rod.

3. The personal roll bar device of claim 2, wherein the rod is substantially U-shaped and configured for flanking the user's spine.

4. The personal roll bar device of claim 1, wherein the impact member is removably engaged with the user's waist by a base strap integral with the impact member.

5. The personal roll bar device of claim 1, wherein the stabilizing means comprises:
   a stabilizer strap configured to be removably engaged with the user's torso; and
   an at least one impact member guide integral with the stabilizer strap and slidably coupled with the impact member.

6. The personal roll bar device of claim 1, wherein the stabilizing means comprises:
   a relatively rigid upper body protector configured for removable engagement with the user's upper body; and
   an at least one impact member guide integral with a rear side of the upper body protector and slidably coupled with the impact member.

7. The personal roll bar device of claim 6, wherein the upper body protector comprises at least one of: a front torso guard, a rear torso guard, and a pair of shoulder guards.

8. The personal roll bar device of claim 1, wherein the impact member is relatively straight.

9. The personal roll bar device of claim 1, wherein the impact member is configured to approximate the curvature of the user's back, neck and head.

10. The personal roll bar device of claim 1, wherein the impact member is configured for allowing the user to comfortably wear a helmet during use of the device.

11. The personal roll bar device of claim 1, wherein the height of the impact member is selectively adjustable.

12. The personal roll bar device of claim 1, wherein the impact member provides an at least one shock absorbing means.

13. A personal roll bar device for protecting a user's head, neck and back and transferring impact forces substantially to the waist of the user in the event the user experiences a head-first fall, the device comprising:
   an elongate rigid rod positioned adjacent the user's back and spaced apart from the user's head, neck and shoulders, the rod removably engaged with the user's waist and extending upwardly therefrom above a top of the user's head;
   a relatively rigid upper body protector configured for removable engagement with the user's upper body; and
   an at least one rod guide integral with a rear side of the upper body protector, the at least one rod guide slidably coupled with the rod and configured for maintaining the rod adjacent the user's back during use;
   whereby, in the event the user experiences a head-first fall while using the device, an upper end of the rod substantially protects the user's head and neck from initial impact, with the resulting impact forces being distributed through the rod and substantially absorbed by the user's waist, thereby reducing the risk of burst and compression fractures in the user's neck and back.

14. A personal roll bar device for protecting a user's head, neck and back and transferring impact forces substantially to the waist of the user in the event the user experiences a head-first fall, the device consisting essentially of:
   an elongate, substantially U-shaped, rigid rod positioned adjacent the user's back and spaced apart from the user's head, neck and shoulders, the rod removably engaged with the user's waist by a base strap integral with the rod and configured for encircling and being securely fastened about the user's waist, the rod extending upwardly from the base strap above a top of the user's head; and
   a stabilizing means removably engaged with the user's upper body and slidably coupled with the rod for maintaining the rod adjacent the user's back during use;
   whereby, in the event the user experiences a head-first fall while using the device, an upper end of the rod substantially protects the user's head and neck from initial impact, with the resulting impact forces being distributed through the rod and substantially absorbed by the user's waist, thereby reducing the risk of burst and compression fractures in the user's neck and back.

* * * * *